United States Patent
Jafari et al.

(10) Patent No.: US 10,622,180 B2
(45) Date of Patent: Apr. 14, 2020

(54) METHOD FOR PRODUCING AN ELECTRON EMITTER COATED WITH A NANOROD-CONTAINING COATING

(71) Applicant: Cetteen GmbH, Erlangen (DE)

(72) Inventors: Houman Jafari, Erlangen (DE); Bo Gao, Erlangen (DE); Immo Weber, Erlangen (DE)

(73) Assignee: CETTEEN GMBH, Förchheim (DE)

( * ) Notice: Subject to any disclaimer, the term of this patent is extended or adjusted under 35 U.S.C. 154(b) by 0 days.

(21) Appl. No.: 16/348,061

(22) PCT Filed: Nov. 8, 2017

(86) PCT No.: PCT/EP2017/001299
§ 371 (c)(1),
(2) Date: May 7, 2019

(87) PCT Pub. No.: WO2018/086737
PCT Pub. Date: May 17, 2018

(65) Prior Publication Data
US 2019/0287753 A1    Sep. 19, 2019

(30) Foreign Application Priority Data

Nov. 8, 2016 (DE) .......................... 10 2016 013 279

(51) Int. Cl.
*H01J 9/02* (2006.01)
*C01B 32/168* (2017.01)
(Continued)

(52) U.S. Cl.
CPC ............ *H01J 9/025* (2013.01); *C01B 32/158* (2017.08); *C01B 32/16* (2017.08); *C01B 32/168* (2017.08);
(Continued)

(58) Field of Classification Search
CPC .. H01J 9/025; H01J 1/304; H01J 2201/30434; C09D 1/00; C09D 5/20;
(Continued)

(56) References Cited

U.S. PATENT DOCUMENTS 6,097,138 A    8/2000   Nakamoto
6,914,372 B1   7/2005   Roach
(Continued)

FOREIGN PATENT DOCUMENTS

CN    105565295 A    5/2016
DE    60305371       5/2007
(Continued)

OTHER PUBLICATIONS

Bocharov, Grigory S. et al., Theory of Carbon Nanotube (CNT)—Based Electron Field Emitters, Nanomaterials (Basel), Sep. 2013, 393-442, online 1-57.
(Continued)

*Primary Examiner* — Donald L Raleigh

(57) ABSTRACT

A method is disclosed for producing an electron emitter (1) with a component surface (3) of which is coated with a coating (2) that contains nanorods (4, 7), in particular carbon nanotubes. According to said method, an elastomer film is applied and is then peeled off to obtain a surface from which carbon nanotubes (7) with an upright orientation project upward from an inorganic and electrically conductive adhesive layer (5). In another example, an overall coating region of the electron emitter (1) has an average number (n) of carbon nanotubes (7) with a predominantly upright orientation that project upward from the electrically conductive adhesive layer (5), the number of nanotubes (7) with a predominantly upright orientation per mm² protruding from
(Continued)

the adhesive layer deviating from the average value (n) by not more than 25% for each partial coating region of a size of at least $10^8$ mm$^2$.

18 Claims, 10 Drawing Sheets

(51) Int. Cl.

| | | |
|---|---|---|
| C01B 32/16 | (2017.01) | |
| C09D 1/00 | (2006.01) | |
| C09D 5/20 | (2006.01) | |
| C09J 9/02 | (2006.01) | |
| H01J 1/304 | (2006.01) | |
| C01B 32/158 | (2017.01) | |
| B82Y 30/00 | (2011.01) | |
| B82Y 40/00 | (2011.01) | |
| B82Y 10/00 | (2011.01) | |

(52) U.S. Cl.
CPC ............... *C09D 1/00* (2013.01); *C09D 5/20* (2013.01); *C09J 9/02* (2013.01); *H01J 1/304* (2013.01); *H01J 1/3044* (2013.01); *B82Y 10/00* (2013.01); *B82Y 30/00* (2013.01); *B82Y 40/00* (2013.01); *C01B 2202/06* (2013.01); *C01B 2202/22* (2013.01); *C01B 2202/34* (2013.01); *C01B 2202/36* (2013.01); *C01P 2004/133* (2013.01); *H01J 2201/30434* (2013.01); *H01J 2201/30476* (2013.01)

(58) Field of Classification Search
CPC ......... C09J 9/02; C01B 32/16; C01B 32/168; C01B 2202/34; C01B 2202/36; C01B 2202/22; C01B 2202/06; C01P 2004/133; B82Y 40/00; B82Y 30/00
See application file for complete search history.

(56) References Cited

U.S. PATENT DOCUMENTS

| | | | |
|---|---|---|---|
| 2002/0074932 A1* | 6/2002 | Bouchard | B82Y 10/00 313/495 |
| 2004/0055892 A1 | 3/2004 | Oh et al. | |
| 2004/0070326 A1 | 4/2004 | Mao | |
| 2004/0108515 A1* | 6/2004 | Muroyama | B82Y 10/00 257/144 |
| 2004/0169151 A1* | 9/2004 | Yagi | B82Y 10/00 250/492.2 |
| 2008/0170982 A1* | 7/2008 | Zhang | B82Y 10/00 423/447.3 |
| 2015/0361270 A1* | 12/2015 | Tasaki | C09D 11/102 524/500 |

FOREIGN PATENT DOCUMENTS

| | | |
|---|---|---|
| DE | 60221951 | 5/2008 |
| DE | 102005052363 A1 | 4/2010 |
| DE | 102009049663 A1 | 7/2010 |
| DE | 102009040769 A1 | 3/2011 |
| DE | 102010012394 A1 | 9/2011 |
| DE | 102010030887 A1 | 1/2012 |
| DE | 112012004856 | 12/2014 |
| EP | 1579457 A1 | 9/2005 |
| EP | 1957397 B1 | 4/2015 |
| JP | 2000-182509 A | 6/2000 |
| JP | 2007-026711 A | 2/2007 |
| WO | 2014076693 A | 5/2014 |

OTHER PUBLICATIONS

Gautier et al., Enhanced field electron emission properties of hierarchically structured MWCNT-based cold cathodes, Nanoscale Research Letters, Feb. 2014, www.nanoscalereslett.com/content/9/1/55, pp. 1-6.

Hirsch, The Era of Carbon Allotropes, Nature Materials, vol. 9, Nov. 2010, pp. 868-871.

Kuznetzov et al., Electron field emission from transparent multiwalled carbon nanotube sheets for inverted field emission displays, Elsevier, Aug. 2009, Carbon 48, pp. 41-46.

Niels De Jonge et al., Carbon nanotube electron sources and applications, The Royal Society, Aug. 2004, pp. 2239-2266.

Vink et al., Enhanced field emission from printed carbon nanotubes by mechanical surface modification, Applied Physics Lettesr, vol. 83, No. 17, Oct. 2003, pp. 3552-3554.

\* cited by examiner

Emission surface: 0.3cm²
gap width: 180μm

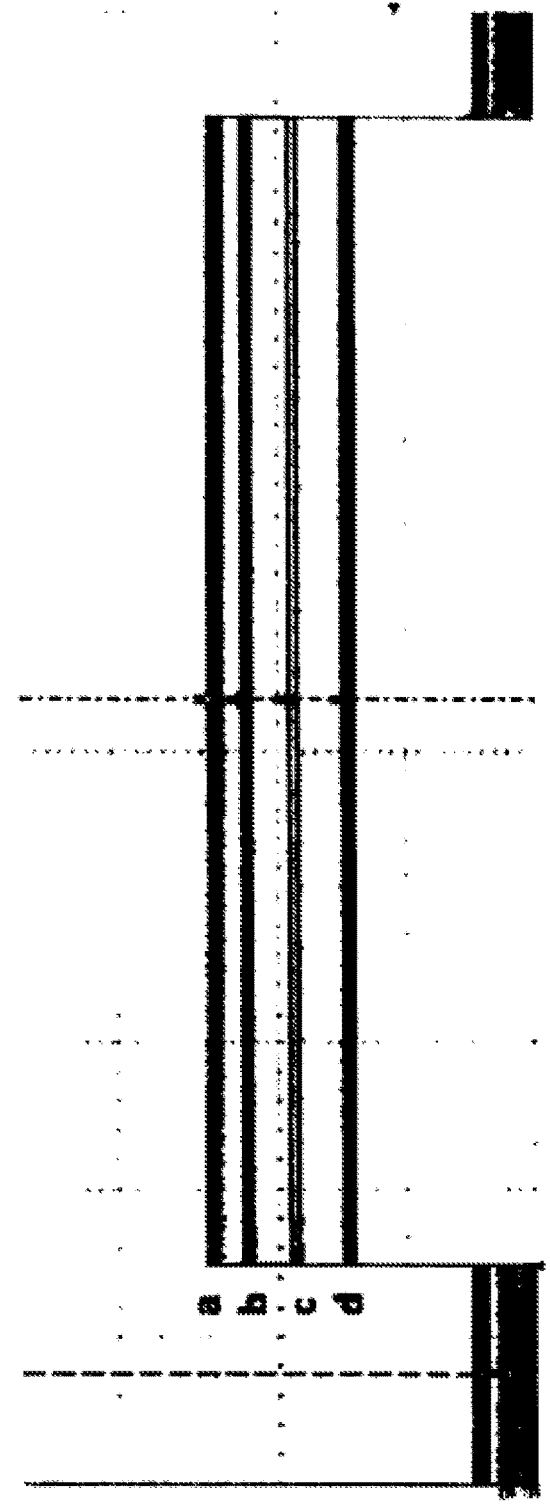

METHOD FOR PRODUCING AN ELECTRON EMITTER COATED WITH A NANOROD-CONTAINING COATING

CROSS REFERENCE TO RELATED APPLICATIONS

This is a National Phase entry of International Application No. PCT/EP2017/001299, filed Nov. 8, 2017, which claims priority to German Patent Application No. 102016013279.5, filed Nov. 8, 2016, the disclosures of which are incorporated herein by reference in their entireties.

FIELD OF THE INVENTION

The invention relates to a method for producing electron emitters coated with a coating containing nanorods, in particular carbon nanotubes. The invention further relates to electron emitters which can be produced by the proposed method and are provided in particular for use as cathodes of x-ray tubes.

BACKGROUND

Nanorods are understood as meaning both solid and hollow rod-shaped particles. Nanorods, if they are not hollow, are also called nanosticks. Otherwise, they are nanotubes. Nanotubes formed of carbon, that is, carbon nanotubes, are referred to as CNTs (carbon nanotubes) for short.

Carbon nanotubes have a variety of technical application potentials; an overview and outlook is summarized in: Kanian Balasubramanian, Marko Burghard, "Funktionalisierte Kohlenstoff-Nanoröhren [in *English: Functionalized carbon nanotubes*]", Chemie in unserer Zeit, 2005, Vol. 39, pp. 16 to 25 and in: Andreas Hirsch, "The era of carbon allotropes", Nature Materials, 2010, vol. 9, pp. 868-871. Carbon nanotubes are approximately cylindrical molecules whose walls, like the planes of graphite, consist of carbon, the carbon atoms on the lateral surface having a honeycomb-like structure with hexagons. Carbon nanotubes can be open or closed tubes; in the case of closed carbon nanotubes their closed ends differ from the graphite structure of the cylindrical walls and transition into a fullerene structure. In the case of carbon nanotubes, one carbon atom is covalently linked to three further carbon atoms on the lateral surfaces and at closed ends. In the case of open carbon nanotubes, the carbon atoms at the respective end are covalently linked to less than three bonding partners. The diameter of the carbon nanotubes is in the range of 0.3 to 200 nm. Lengths of several millimeters for single carbon nanotubes and up to 20 cm for bundles of carbon nanotubes have already been achieved.

In carbon nanotubes, other free atoms and molecules may be included, for example noble gases, metal atoms and metal clusters, carbon dioxide and alkanes. Multi-walled carbon nanotubes comprise those carbon nanotubes in which at least one additional carbon nanotube is included as a separate molecule. Carbon nanotubes may also have heteroatoms, especially nitrogen, and be functionalized with a variety of inorganic and organic radicals.

BRIEF DESCRIPTION OF THE DRAWINGS

Various embodiments of the proposed electron emitter and an unclaimed comparison example (FIGS. 4, 6) will be explained in more detail below with reference to a drawing.

FIG. 16 shows current and voltage values measured during a pulse of 250 ms duration during operation of electron emitter 1 according to FIG. 15.

DETAILED DESCRIPTION

Figure 1:
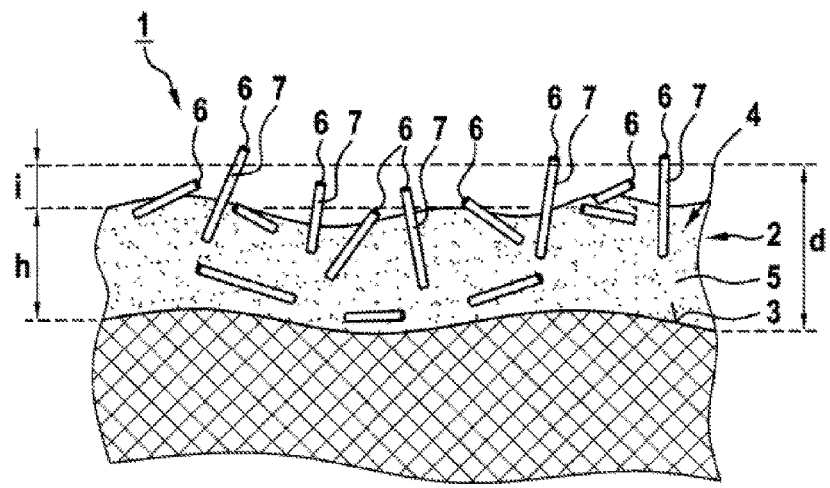
FIG. 1 shows a cross section through an electron emitter 1 with a coating 2 containing carbon nanotubes.

The very high electrical and thermal conductivity of carbon nanotubes allows high current carrying capacity without significant heat development on the individual carbon nanotubes themselves. Furthermore, carbon nanotubes have a very low field strength threshold of less than 2 $V\mu m^{-1}$ for the emission of electrons by an electric field. Therefore, carbon nanotubes are well-suited as components for electron emitters, as for example generally proposed in DE 603 05 371 T2 for a plasma display device, in US 2004 0070326 A1 for a field emission display device and in U.S. Pat. No. 6,914,372 B1 as well as in U.S. Pat. No. 6,097,138 for an electron emitter. In particular, carbon nanotubes are suitable as cathode material for X-ray tubes, as disclosed, for example, in DE 10 2008 052 363 A1, DE 11 2012 004 856 T5, DE 10 2010 012 394 A1, DE 10 2009 049 663 A1 and DE 10 2009 040 769 A1. For the technical background, reference is made to the publication: Richard J Parmee et al., X-ray generation using carbon nanotubes, Nano Convergence (2015)2: 1. Information on CNTs beyond the technical field of electron emitters can be found in the publication: M. S. Fuhrer, Single-Walled Carbon Nanotubes for Nanoelectronics, Advanced Semiconductor and Organic Nano-Techniques (Part II).

In a rod-like electrical conductor as an electrical pole, the respective electric field strength is greatest at both ends. A single carbon nanotube also represents such a rod-shaped electrical conductor. Thus, with an average electric field intensity of the order of magnitude of 1 $V\mu m^{-1}$, the effective local electric field strength at the end of the carbon nanotube can reach $10^3$-$10^4$ V$\mu m^{-1}$. These physical relationships are summarized in: Niels de Jonge, Jean-Marc Bonard, "Carbon nanotube electron sources and applications", Philosophical Transactions of the Royal Society of London A, 2004, vol. 362, pp. 2239 to 2266 and in: Grogory S. Bocharov, Alexander V. Eletskü, "Theory of Carbon Nanotube (CNT)-Based Electron Field Emitters", Nanomaterials, 2013, vol. 3, pp. 393 to 442. Therefore, the field strength threshold for cathodes for emitting electrons having carbon nanotubes can be further lowered by arranging them in a perpendicular preferential direction on the emitter surface. Since single-walled carbon nanotubes are semiconductors and multi-walled carbon nanotubes are metallic conductors, multi-walled carbon nanotubes are particularly suitable for electron emitter applications, as outlined in the paper: Loïck-Alexandre Gautier, Vincent Le Borgne, Samir Al Moussalami, My Ali El Khakani, "Enhanced field electron emission properties of hierarchically structured MWCNT-based cold cathodes", Nanoscale Research Letters, 2014, vol. 9, edition, p. 55 et seq. and in paper: Alexander A. Kuznetzov, Sergey B. Lee, Mei Zhang, Ray H. Baughman, Anvar A. Zakhidov, "Electron field emission from transparent multiwalled carbon nanotube sheets for inverted field emission displays", CARBON, 2010, vol. 48, pp. 41 to 48.

Consequently, especially powerful electron emitters can be realized with carbon nanotubes when the carbon nanotubes are aligned perpendicularly insofar as possible in the sense of an anisotropic preferred direction on the surface of the emitter. Such a preferred direction of the carbon nanotubes also allows more efficient heat dissipation. For example, such arrangements are also known for X-ray tubes from DE 10 2008 052 363 A1, and for cathodes of alkali metal-sulfur batteries from DE 10 2010 030 887 A1.

For electron emitters, temperature-resistant materials such as metal, silicon, glass or ceramics are selected as surfaces for coating with carbon nanotubes. Therefore, it is necessary that the region coated with carbon nanotubes has insofar as possible the same electrical conductivity at all points of the overall coating region, that is, at all points of the overall coating region, the electrical sheet resistance $R_F$ should vary as little as possible. The electrical sheet resistance $R_F$ of a resistive layer is given by the ratio of the electrical isotropic resistivity $\rho$ to the layer thickness of the resistive layer; the unit of electrical sheet resistance $R_F$ is therefore identical to the unit of electrical resistance $\Omega$ (ohms).

In the prior art, the application of carbon nanotubes on the electron emitter is done by chemical vapor deposition. This method is technically complex, does not succeed on all substrate surfaces, must be adapted to the geometry of the surface and often does not lead to uniform deposits. This results in variations in both the density of carbon nanotubes and the electrical surface resistance $R_F$, depending on the location on the overall coating region.

In DE 10 2008 052 363 A1, therefore, the carbon nanotubes are applied to the surface in individual matrix elements. These matrix elements must first be produced separately and thus at high cost by growing carbon nanotubes or by a sintering operation. Furthermore, these matrix elements may only contain less than 5% by volume of carbon nanotubes. Otherwise, these matrix elements are excessively brittle. No further details with respect to the components of the sintered body and the actual sintering operation with respect to the matrix elements are provided in DE 10 2008 052 363 A1; definite chemical compounds, mixing ratios and definite process conditions are not disclosed.

EP 1 957 397 B1 describes a method for producing electron emitters with a coating containing carbon nanotubes. This method relies on applying a paste containing carbon nanotubes, an organic binder, metal particles and solvents. The paste is applied to the overall coating region and then either cured or annealed by polymerization. However, EP 1 957 397 B1 does not disclose the composition of the organic binder.

DE 602 21 951 T2 likewise describes a photolithographic method for producing electron emitters with a coating containing carbon nanotubes. This method is also based on applying a paste containing carbon nanotubes, alkali silicate and a binder.

How to achieve precisely a preferred direction of the carbon nanotubes in the matrix elements is not disclosed in DE 10 2008 052 363 A1. In DE 10 2010 030 887 A1 a vertical preferred direction of the carbon nanotubes is to be achieved on a metal surface by chemical vapor deposition.

One way of circumventing the disadvantages of chemical vapor deposition and simultaneously applying carbon nanoparticles in a preferred direction to a substrate surface is disclosed by CN 105565295 and EP 1 579 457 B1. However, these methods are limited to magnetized carbon nanotubes and rely on their complex deposition from solution in a magnetic field. These methods also are limited with regard to the substrate material and the geometry of the overall coating region.

No information with respect to the regular nature of the overall coating region in terms of a location-independent number of carbon nanotubes, the electrical sheet resistance $R_F$ and the shape and extent of the anisotropic arrangement of the carbon nanotubes per unit region can be found in DE 10 2008 052 363 A1, DE 10 2010 030 887 A1, CN 105565295 or EP 1 579 457 B1.

The paper: T. J. Vink, M. Gillies, J. C. Kriege, H. W. J. J. van de Laar, "Enhanced field emission from printed carbon nanotubes by mechanical surface modification", Applied Physics Letters, 2003, vol. 83, issue 17, pp. 3352 to 3354, introduces a method in which a carbon nanotube-containing paste is applied by screen printing on the surface of a substrate. The advantages of screen printing are that with screen printing thin as well as thick, shape- and edge-precise layers can be applied to a variety of materials of different surface geometry. The screen printing method is superior to wet-chemical or photolithographic techniques and is technically particularly easy to carry out. The substrate with the printed paste thereon is annealed stepwise from 40° C. to 400° C. The adhesive layer should then have an organic binder and carbon nanotubes as constituents. Finally, the adhesive side of an adhesive film, for example a commercially available adhesive strip for do it yourself (DIY) or office use, is successively pressed and pulled off again at each location of the coating region. In this method step, a proportion of the coating surface, which consists of loose material and contaminants, is removed. Thus, the layer thickness of the coating is reduced. This treatment results in a surface with carbon nanotubes protruding upright, that is, oriented in the perpendicular preferential direction.

However, the results of this method are not sufficiently reproducible with respect to the number of upright carbon nanotubes per unit surface. After carrying out this method, even shallow depressions in the coating region concerned have contaminants, wherein surface-protruding and upright carbon nanotubes cannot be found in the depressions. This results in a very irregularly structured overall coating region. The coating produced by this method does not have the required temperature resistance of at least 500° C. for technical uses, for example as cathodes in electron emitters.

It is the object of the invention to provide a method for producing electron emitters, by means of which a sufficiently thermostable layer for technical applications can be produced without the aid of a magnetic field, from which carbon nanotubes protrude in a preferred direction relative to the surface.

This object is achieved by the method with the features of claim 1. With this method, an electron emitter according to claim 15 can be produced. Embodiments and advantages of the invention explained below in connection with the production method also apply mutatis mutandis (having changed what needs to be changed or once the necessary changes have been made) to the device, that is to say the electron emitter, and vice versa.

The method of claim 1 includes the use of nanorods for producing an electron emitter. Analogously, the electron emitter according to claim 15 comprises nanorods as constituents of a coating. The nanorods of the electron emitter may have a uniform or non-uniform composition and may be formed either as hollow bodies, i.e., as tubes, or solid.

For example, the nanorods, in particular nanotubes, can be formed from metal oxides. In principle, nanorods made of metal oxides—as well as nanowires, which are not relevant in the present case—are known, for example, from the publication "Theme issue: inorganic nanotubes and nanowires", Journal of Materials Chemistry, 2009, 19, 826-827. In this publication, among others, titanium oxide ($TiO_2$), zinc oxide (ZnO) and aluminum oxide ($Al_2O_3$) are mentioned and named as materials from which nanotubes may be formed.

Metal oxides, for example titanium oxide, zinc oxide or manganese oxide ($Mn_xO_y$), both in pure and in doped form, are suitable for producing the emitter according to the invention. Likewise, other materials from which the nanorods are constructed or which are contained in the nanorods, for example, metals, sulfides, nitrides or carbides, either in pure or in doped form may be present.

For technical background, reference is made to the following documents:

Greta R. Patzke et al., Oxidic Nanotubes and Nanorods—Anisotropic Modules for a Future Nanotechnology, Angew. Chem. Int. Ed. 2002, 41, 5000-5015

Joshua Goldberger et al., Inorganic Nanotubes: A Novel Platform for Nanofluidics, Accounts of Chemical Research, vol. 39, no. 4, 2006, 39, 239-248

C. N. R. Rao et al., Inorganic nanotubes, Dalton Celebration Perspective, Dalton Trans., 2003, 1-24

Reshef Tenne et al., Nanotubes from Inorganic Materials, Topics Appl. Phys. 80, 83 115 Springer-Verlag Berlin Heidelberg 2001

Reshef Tenne, Recent advances in the research of inorganic nanotubes and fullerene-like nanoparticles, Frontiers of Physics, 2014, 9(3): 370-377

Christos D. Malliakas et al., Inorganic Single Wall Nanotubes of $SbPS_{4-x}Se_x$ ($0 \leq x \leq 3$) with Tunable Band Gap, J. AM. Chem. Soc. 2006, 128, 6538-6539

Dmitri Golberg et al., Boron Nitride Nanotubes, Advanced Materials 2007, 19, 2413-2432, WILEY-VCH Nasreen G. Chopra et al., Boron Nitride Nanotubes, Science vol. 269, Aug. 18, 1995

Angel Rubio et al., Theory of graphitic boron nitride nanotubes, Rapid Communications vol. 49, no. 7, Physical Review B, Feb. 15, 1994

Wei-Qiang Han et al., Transformation of $B_XC_YN_Z$ nanotubes to pure BN nanotubes, 2002 American Institute of Physics, Applied Physics Letters, vol. 81, no. 6, Aug. 5, 2002

Michael W Smith et al., Very long single- and few-walled boron nitride nanotubes via the pressurized vapor/condenser method, IOP Publishing Nanotechnology 20 (2009)

If the electron emitter according to the invention contains a sulfide ($S^{2-}$), it may be, for example, a metal sulfide, in particular molybdenum disulfide ($MoS_2$). Boron nitride (BN), aluminum nitride (AlN), carbon nitride ($C_xN_y$) and gallium nitride (GaN) may be mentioned in particular as nitrides from which nanorods of the electron emitter may be completely or partially constructed. Silicon carbide (SiC), in particular, is suitable for producing the nanorods, in particular nanotubes. Likewise, nanorods, in particular in the form of nanotubes, can be produced from silicon (Si), optionally with doping elements.

The use of nanorods containing cerium (Ce) or lanthanum (La) is also possible in the context of the production of the electron emitter. In this context, reference is made by way of example to the patent application WO 2014/076693 A1 and to the following further documents:

Junqi Xu et al., Self-catalyst growth of LaB6 nanowires and nanotubes, Science Direct, 2006 Elsevier B. V. Chemical Physics Letters 423 (2006) 138-142

Wei Wei et al., LaB6 tip-modified multiwalled carbon nanotube as high quality field emission electron source, American Institute of Physics, Appl. Phys. Lett. 89, 203112 (2006)

H. B. Kushkhov et al., Electrochemical Synthesis of $CeB_6$ Nanotubes, Journal of Materials Science and Chemical Engineering, 2014, 2, 57-62

As starting materials for producing the nanorods, which emit electrons during operation of the electron emitter, rod-shaped, optionally hollow, elements made of polymeric materials are also suitable. In this context, reference is made to the following documents:

Yun-Ze Long et al., Recent advances in synthesis, physical properties and applications of conducting polymer nanotubes and nanofibers, Elsevier, Progress in Polymer Science 36 (2011) 1415-1442

Yun-Ze Long et al., A Review on Electronic Transport Properties of Individual Conducting Polymer Nanotubes and Nanowires, Nanowires Science and Technology, book edited by Nicoleta Lupu, pp. 42 February 2010

Filippo Pierini et al., Comparison between Inorganic Geomimetic Chrysotile and Multiwalled Carbon Nanotubes in the Preparation of One-dimensional Conducting Polymer Nanocomposites, Fibers and Polymers 2015, vol. 16, no. 2, 426-433

Alla Voldman et al., A Nanocomposites of Polyaniline/Inorganic Nanotubes, Macromolecular Chemistry and Physics 2013, 214, 2007-2015

Mei Gao et al., Aligned Coaxial Nanowires of Carbon Nanotubes Sheathed with Conducting Polymers, Wiley-VCH Verlag GmbH, D-69451 Weinheim, 2000

Yeon-Yi Kim et al., Preparation and Characteristics of Conducting Polymer-Coated MWCNTs as Electromagnetic Interference Shielding Materials, Carbon Letters, vol. 12 no. 1, March 2011 pp. 48-52

The nanorods of the electron emitter can be produced from starting products which are completely composed of polymeric materials or from starting products which are only partially made of polymer materials, in particular in the form of a coating, as is known in principle from the last two documents mentioned above. In both cases, the temperature resistance required for the operation of the electron emitter can be achieved by pyrolysis.

In numerous possible embodiments, carbon nanotubes are used as nanorods in the context of the method according to the invention. With regard to the structure and the properties of carbon nanotubes, reference is made to the prior art cited above and to the following documents, which each address combinations of carbon with further constituents in nanotubes:

Toshihiko Fujimori et al., Conducting linear chains of sulfur nanotubes, nature communications 4:2162, published 12 Jul. 2013

Laura Cabana et al., Synthesis of PbI2 Single-Layered Inorganic Nanotubes Encapsulated Within Carbon Nanotubes, Advanced Materials 2014, 26, 2016-2021

V. K. Ksenevich et al., Electrical properties of carbon nanotubes/WS2 nanotubes (nanoparticles) hybrid films, Nanosystems: Physics, Chemistry, Mathematics, 2016, 7 (I), pp. 37-43

Rajkumar Patra et al., Enhanced field emission from cerium hexaboride coated multi-walled carbon nanotube composite films: A potential material for next generation electron sources, Journal of Applied Physics 115, 094302 (2014)

Also carbon nanotubes or nanotubes made of other materials, for example oxides or nitrides, filled or doped with a metallic or ceramic material, for example with nitrogen (N), gold (Au) or europium (Eu, are suitable for use in the electron emitter coating provided for emission of electrons. In principle, such nanotubes are known, for example, from the following documents:

Dmitri Golberg et al., Properties and engineering of individual inorganic nanotubes in a transmission electron microscope, The Royal Society of Chemistry 2009, Journal of Material Chemistry, 2009, 19, 909-920

Hua Chen et al., Nano Au-decorated boron nitride nanotubes: Conductance modification and field-emission enhancement, American Institute of Physics, Appl. Phys. Lett. 92, 243105 (2008)

Hua Chen et al., Eu-doped Boron Nitride Nanotubes as a Nanometer-Sized Visible-Light Source, Advanced Materials 2007, 19, 1845-1848

In embodiments in which carbon nanotubes, especially exclusively consisting of carbon, are used as nanorods, said nanorods have, for example, an outer diameter of 0.4 nm to 20 nm and a length of 1 µm to 20 µm. A general reference to carbon nanotubes in the following description includes single-walled and multi-walled, double-sided or one-sided open or closed carbon nanotubes in mixed and pure form, regardless of their respective production method.

The proposed method for producing an electron emitter with a coating containing carbon nanotubes on a component surface comprises the following steps:
(I) applying nanorods, in particular carbon nanotubes, to the overall coating region on an inorganic and electrically conductive adhesive layer;
(II) applying a liquid polymer mixture to the overall coating region of the device, the polymer mixture containing a crosslinkable polymer and a crosslinking component;
(III) curing the polymer film resulting from step (II) to form an elastomer film;
(IV) peeling off the elastomer film generated according to method step (III).

FIG. 1 shows a cross section through a region of the overall coating region of electron emitter 1, which was produced by the exemplary method steps (I) to (IV) set out above. Coating 2 on component surface 3 has carbon nanotubes 4, wherein coating 2 contains multi-walled carbon nanotubes with an outer diameter of 2 nm to 20 nm and a length of 1 µm to 10 µm. Coating 2 with an average coating thickness d of 13 µm consists of electrically conductive adhesive layer 5 with an average partial layer thickness h of 10 µm and carbon nanotubes with the ends 6 protruding from the adhesive layer. Ends 6 of the carbon nanotubes have an average differential distance i of 3 µm to adhesive layer 5. Thus, average coating thickness d is composed of the sum of partial layer thickness h and the mean differential distance i. Parameters d, h and i extend over the overall coating region.

Electron emitter 1 has, over the overall coating region, an average number n of carbon nanotubes 7 of $10^5$ per $mm^2$ protruding from the electrically conductive adhesive layer and predominantly with an upright orientation, as well as an average electrical sheet resistance $R_{FM}$ of 0.5Ω. The parameters n and $R_{FM}$ thus also extend over the overall coating region.

Per partial coating region of size $10^{-8}$ $mm^2$, the coating thickness, the number of carbon nanotubes protruding from the adhesive layer and with a predominantly upright orientation per $m^2$, and the electrical sheet resistance $R_F$ deviate not more than 25% from the average values d, n and $R_{FM}$.

As components, adhesive layer 5 has multi-walled carbon nanotubes with an outer diameter of 2 nm to 20 nm and a length of 1 µm to 10 µm, single-walled carbon nanotubes with an outer diameter of 0.4 nm to 4 nm and a length of 1 µm to 10 µm, other components made of carbon, silver particles and silicon carbide. As a further, characteristic constituent, adhesive layer 5 contains glass particles which are sintered together in at least one point of contact. Adhesive layer 5 is firmly bonded by sintering the glass articles on the surface of the device. Here the carbon nanotubes are firmly embedded between these sintered glass particles. Coating 2 has a thermal stability of 650° C.

For a component of the electron emitter, the surface of which is provided partly or wholly for coating with nanorods, in particular carbon nanotubes, by the proposed method, an electrically conductive or non-conductive material having a temperature resistance of at least 600° C. and preferably of more than 800° C. can be chosen. As substrates, inorganic materials, such as silicon, metals and metal alloys with a melting point above 1000° C., glasses or ceramics are particularly suitable for the proposed method.

Examples of suitable metals are molybdenum (Mo), tungsten (W), nickel (Ni) and copper (Cu). Examples of suitable metal alloys are stainless steels. In particular, those iron (Fe) alloys are suitable which contain cobalt or nickel or palladium or platinum or nickel and cobalt (Co) as further constituents and preferably have a coefficient of thermal expansion of not more than 5 ppm $K^{-1}$.

Examples of suitable glasses are silicate glasses and borate glasses with a transformation range above 850° C. Examples of suitable ceramics are fired clay, porcelain, magnesium oxide (MgO), boron carbide ($B_4C$), boron nitride, aluminum nitride, aluminum oxide ($Al_2O_3$), boron-aluminum and titanium-aluminum and zirconium-aluminum mixed oxides, zirconium oxide ($ZrO_2$), mullite (porcelainite or $3Al_2O_3$ $2SiO_2$ or $2Al_2O_3$ $SiO_2$), silicon carbide and borides, silicides and titanates.

The proposed method can also be used to coat one or more coatings on the surface of a component which is provided as a component for the electron emitter. For example, the proposed method can be used to coat a surface of a coating of tungsten, molybdenum, silver, a silver-platinum alloy, a silver-palladium alloy, gold, a gold-platinum alloy, a gold-palladium alloy, platinum, palladium, carbon, copper or an iron-nickel alloy, which is applied to alumina.

An electrically conductive layer of this type which is purely inorganic has been found to be sufficiently temperature resistant. Such a layer is free of those chemical compounds which have covalent carbon-hydrogen bonds.

The electrical adhesive layer contains such particles which are sintered together in at least one point of contact. In this case the adhesive layer is also firmly bound by sintering these particles on the surface of the component. The carbon nanotubes are firmly embedded between these sintered particles.

The required contact for electrical conduction between the applied carbon nanotubes is imparted by the adhesive layer. The adhesive layer thus contributes to an average electrical surface conductivity over the overall coating region. The electrical conductivity within the adhesive layer is imparted by mutually contacting carbon nanotubes.

Improved electrical conductivity is exhibited by such an inorganic adhesive layer which contains further electrically conductive particles in addition to carbon nanotubes.

The inorganic and electrically conductive adhesive layer has a thermal stability of at least 600° C. This temperature is 100° C. higher than the maximum temperature, which is usually achieved in at least one manufacturing step of the electron emitter.

In the present invention, the inorganic and electrically conductive adhesive layer can be produced by, for example, firing a layer. This adhesive layer then contains sinterable particles, carbon nanotubes and optionally additional conductive particles 8. Here, the firing temperature is chosen so that the sintering of the sinterable particles takes place without formation of a melt; the nanorods, in particular carbon nanotubes, as well as optionally added further electrically conductive particles 8 do not decompose, but complete decomposition or volatilization of all organic constituents of the layer applied in the method step (I) is ensured.

The nanorods preferably present in the form of carbon nanotubes are randomly distributed in the electrically conductive adhesive layer prior to method step (IV). Before method step (IV), only a negligible number of nanorods protrude from the adhesive layer.

In the adhesive layer, the sinterable particles are sintered just so firmly together that in method step (IV) only the portion of the coating surface is removed, which consists of loose material and contaminants. After the method step (IV), a surface is obtained from which carbon nanotubes or other nanorods with an anisotropic preferential direction protrude perpendicular to the substrate surface.

Particles, in particular those made of inorganic oxides, mixed oxides and inorganic oxide mixtures, have proven to be suitable sinterable particles. Suitable oxides include, for example, silica, alkali-containing silica, tin oxide, lead oxide, boron oxide and alumina, and mixed oxides and mixtures thereof.

Suitable additional electrically conductive particles 8 include, for example, particles made of conductive carbon, such as carbon black, graphite or graphene, or particles of indium tin oxide (ITO) or metal particles, such as those made of silver (Ag), gold (Au), tungsten (W), iron (Fe) or nickel (Ni), and mixtures thereof.

In the following, the individual steps and further developments of the proposed method will be discussed.

Preferably, in method step (I), a paste containing nanorods, in particular carbon nanotubes, and sinterable particles is applied to the device by means of screen printing and then fired to form an inorganic and electrically conductive adhesive layer. In doing so, after firing, the sinterable particles are sintered together in at least one point of contact and impart adhesion on the surface of the device.

After the firing operation in the method step (I), the sinterable particles impart the adhesion both of the adhesive layer on the component surface and of the nanorods in the adhesive layer.

Using the screen printing method, various paste materials can additionally be applied to the surface of the device with the proposed method between the individual method steps (I) to (IV) or preferably after method step (IV) in order to realize further electronic functions. This relates not only to electrical conductors but also, for example, to dielectrics, capacitors, resistors, coils, antennas, diodes, transistors, electroluminescent components, biosensors and embedding components in multilayer circuits. For such combinatorial developments, therefore, an electrically insulating material, in particular ceramic materials, has proven to be advantageous as a substrate.

In addition to nanorods and sinterable particles, the paste used for screen printing preferably also contains carbide-forming particles, an organic dispersant, an organic solvent and optionally additional conductive particles 8 as functional components. Here, the organic dispersant and the organic solvent serve to distribute the carbon nanotubes or other nanorods and all other particles contained. After firing, the adhesive layer then contains additional conductive particles and carbides.

Suitable organic dispersants are, for example, polyvinylpyrrolidone, ethyl cellulose, ethylene glycol and sodium dodecylsulfate. Suitable organic solvents are, for example, isopropanol, ethanol, acetone, N-methyl-2-pyrrolidone, butyl carbitol acetate, terpineols and dimethylformamide. The organic dispersants and organic solvents react particularly advantageously with the carbide-forming particles to form carbides in the firing operation in the method step (I) according to claim 2. These carbides then improve the adhesion of the resulting inorganic and electrically conductive adhesive layer on the component surface. Suitable carbide-forming particles are, for example, silicon, titanium and iron.

Conductive carbons, such as carbon black, graphite or graphene, or particles made of indium tin oxide or metal particles, such as, for example, silver, gold, tungsten, iron or nickel, and mixtures thereof, are particularly suitable as conductive particles 8 additionally optionally added to the paste.

Alternatively, conductive metal particles may be generated in the adhesive layer by adding metal nitrates to the paste. These nitrates assist in the firing operation in that both the metal cation and the nitrate anion oxidize organic components of the paste. In this process, the respective metal cation is reduced to form the metal. Nitrates of the metals iron, ruthenium, nickel, palladium, platinum, copper, silver and gold have proven to be particularly suitable. In the case of nitrates of the metals iron and ruthenium, the corresponding metal carbides also form.

For the paste, the total solids content, average particle size and viscosity are critical parameters. Total solids content is composed of the proportions by weight of the nanorods, the conductive particles 8 and the binder. The total solids content relative to the total weight of the paste significantly influences the usability of the paste as a screen printing material as well as the packing density of the fired film.

In the case of the total solids content, an optimum can be found in which, on one hand, the paste can still be distributed sufficiently easily in the pores of the printing screen and, on the other hand, the adhesive layer produced by firing is still sufficiently dense. If the total solids content is very high, a particularly dense adhesive layer can be produced; however, a correspondingly high pore size of the screen is required for screen printing. Therefore, a total solids content of 10 to 50% by weight has proven to be advantageous for the proposed method, in particular for generating a high coating thickness of the adhesive layer.

The average grain size of all the particles contained also affects the sieving ability of the paste and the properties of the fired film. Although very small particles are advantageous for the sieving ability of the paste, excessively small particles lead to an excessively high packing density of the fired film. An average grain size of all particles contained in the paste of 0.1 µm to 10 µm has therefore proven to be advantageous for the proposed method.

The lower the viscosity of the paste, the smaller the pore size of the printing screen that can be chosen. If the viscosity of the paste is too low, in particular if the proportion by weight of a chosen organic solvent or solvent mixture is too high, only a small coating thickness of the adhesive layer can be achieved. A dynamic viscosity of 10000 to 100000 cP of the paste is therefore particularly advantageous for the proposed method.

For the proposed method for producing electron emitter, therefore, a paste has been proven to be particularly advantageous which contains not more than 2% by weight nanorods, in particular carbon nanotubes, a total of not more than 20% by weight of glass particles, additional conductive particles 8 and carbide-forming elements of an average grain size of 0.1 µm to 5 µm, up to 48.91% by weight terpineols, up to 20.96% by weight butyl carbitol acetate and up to 8.13% by weight ethyl cellulose. Surprisingly, it has been found that such a paste is also suitable for producing three-dimensional conductive workpieces by means of generative production methods, such as, for example, 3D printing.

In the proposed method, the firing of the applied paste to form the adhesive layer is carried out with a stepwise increase in temperature up to 800° C. For this purpose, a firing time is chosen, after which the electrically conductive adhesive layer thus produced has only inorganic constituents.

Suitable polymer mixtures for the method step (II) are those liquid preparations with a crosslinkable polymer and with a crosslinking component which do not dissolve the adhesive layer, do not react with the carbon nanotubes and form an elastomer film in the method step (III). The method step (III) takes place thermally or photochemically depending on the chosen polymer mixture. The elastomer film is then finally peeled off from the overall coating region in the method step (IV).

With this further developed method, the coating applied in the method step (I) is post-treated particularly advantageously in the method steps (II) to (IV) over the overall coating region, even in hard-to-reach partial regions and deep depressions, in such a way that carbon nanotubes protrude from the adhesive layer with an upright orientation. In addition, the peeling off (or removing) of the elastomer film in the method step (IV) removes contaminants from the surface of the coating. Furthermore, with the proposed method, the removal of contaminants and the upright orientation of carbon nanotubes can be achieved on those coating regions which are uneven or have a complex geometry. Thus, the proposed method is superior to those of the prior art.

A particularly suitable mixture for the polymer mixture for the method step (II) is a mixture which is liquid at 20° C. and consists of a mixture of two components. In this case, one component contains a crosslinkable silicone polymer and the other component contains a crosslinking reagent. A suitable crosslinkable silicone polymer is, for example, polydimethylsiloxane.

The two components are preferably mixed just before carrying out the method step (II) and applied, for example, either by pouring, brushing or spin coating over the overall coating region. In this case, it has proven particularly suitable to use polymer mixtures which are thermally cured to an elastomer film in the method step (III).

Such components for generating the elastomer film are commercially available, for example, in the form of two-component sets called: SYLGRAD 184 from Dow Corning Inc., wherein the component containing the crosslinkable silicone polymer is mixed with the component containing the crosslinking reagent.

With these variants, the proposed method is particularly well reproducible. The chemical composition of the inorganic and electrically conductive adhesive layer does not change after carrying out the method steps (II) to (IV). Particularly advantageously, the proposed method can be carried out as an automated production process, in particular if the paste in the method step (I) is applied to the device by screen printing.

In the following, the electron emitter produced by the proposed method and its developments will be discussed.

After carrying out the method step (IV), over the overall coating region the electrically conductive adhesive layer has an average partial layer thickness h of 3 µm to 20 µm and the ends of the nanorods, preferably formed as carbon nanotubes, protruding from the conductive layer have an average differential length i of 0.1 µm to 10 µm, wherein the nanorods are firmly connected to the surface of the device via the adhesive layer. The average coating thickness d over the overall coating region is composed of the sum of the average partial layer thickness h and the average differential length i and therefore amounts to 3.1 µm to 30 µm.

Essential for the emission are those carbon nanotubes or other nanorods suitable for the emission of electrons which protrude from the adhesive layer. Carbon nanotubes or nanorods of any other composition which are completely enclosed by the electrically conductive adhesive layer contribute only insignificantly to the emission of electrons.

If too few carbon nanotubes or other nanorods protrude from the electrically conductive adhesive layer, the result is a reduced emission performance. However, if the nanorods, in particular carbon nanotubes, protruding from the adhesive layer and with an upright orientation, are too close to one another, the result is a considerable reduction in the electric field strength at the protruding ends of the carbon nanotubes. Thus, too high a number of nanorods protruding from the adhesive layer and with an upright orientation also results in reduced emission performance.

The electron emitter produced by the proposed method has a high emission performance if said electron emitter contains an average number n of nanorods, in particular carbon nanotubes, protruding from the adhesive layer with a predominantly upright orientation of $10^4$ to $10^6$ per $mm^2$ over the overall coating region. In the present case, a predominantly upright orientation of nanorods is therefore understood to mean an orientation in which nanorods applied to the component surface are arranged with a maximum deviation of 45° perpendicular to a tangent at their respective point of attachment. In the present invention, the point of attachment is understood to mean the point of intersection of the average geometric longitudinal axis of the respective nanorods with the surface of the substrate.

Furthermore, for a high emission performance, an average electrical sheet resistance $R_{FM}$ of not more than 1Ω over the overall coating region is required, wherein the average electrical sheet resistance $R_{FM}$ is related to the average coating thickness d. This critical average electrical sheet resistance $R_{FM}$ of 1Ω is not exceeded in the case of the electron emitter produced by the proposed method.

It has been found in the case of the proposed electron emitter that, per partial coating region of a size of at least $10^{-8}$ mm$^2$, the coating thickness, the number of nanorods protruding from the adhesive layer with an upright orientation per mm$^2$, and the electrical sheet resistance $R_F$ do not deviate by more than 25% from the average values d, n and $R_{FM}$. This enables the construction of electron emitters of high constant performance density on the overall coating region of the device. Consequently, the formation of hot spots and flashovers is minimized on the overall coating region due to this very regular surface finish; thus, the proposed electron emitter also has a particularly long useful life.

The performance of the proposed electron emitter can be further improved if the ratio of the average partial layer thickness h to the mean differential length i is from 1 to 3. With regard to material savings and the desired high conductivity, it has proven to be particularly advantageous for the proposed electron emitter if, over the overall coating region, the electrically conductive adhesive layer has an average partial thickness h of 3 μm to 15 μm and the ends of the nanorods, in particular carbon nanotubes, protruding from the adhesive layer have an average differential length i of 3 μm to 5 μm.

In a further advantageous embodiment of the proposed electron emitter, the coating contains multi-walled carbon nanotubes with an outer diameter of 2 nm to 20 nm and a length of 1 μm to 10 μm. Preferably, multi-walled carbon nanotubes, which are produced by an arc discharge method, are used for this purpose. Such carbon nanotubes produced by an arc discharge method have a very regular acicular structure with only a few curvatures. With these combinatorial developments of the proposed electron emitter, its emission performance can be further increased.

The following is an exemplary embodiment of the proposed method for producing an electron emitter with a coating containing carbon nanotubes.

For this purpose, the preparation of a screen-printable paste suitable for the method step (I) is described first.

In a mixing container, 2% by weight of a mixture of carbon nanotubes, 16% by weight glass particles, 2% by weight silver particles, 2% by weight silicon particles, 48.91% by weight terpineol, 20.96% by weight butyl carbitol acetate and 8.13% by weight ethyl cellulose are weighed and mixed. The ethyl cellulose dissolves in terpineol when mixed.

The mixture of carbon nanotubes contains 86% by weight of multi-walled carbon nanotubes with an outer diameter of 2 nm to 20 nm and a length of 1 μm to 10 μm, single-walled carbon nanotubes and other constituents made of carbon. This mixture is produced by an arc discharge method.

This mixture is passed through a three-roll mill, wherein the rolling operation is performed cyclically until all particles have an average grain size of 0.1 μm to 5 μm. As alternative to the rolling mill, a ball mill can be used.

Below, by way of example, carrying out the method step (I) of applying carbon nanotubes on an electrically conductive adhesive layer is explained in greater detail.

The paste is applied by screen printing in an overall coating region on the surface of the device made of sintered alumina, provided as a component for an electron emitter. Thereafter, the printed device is allowed to rest for 15 minutes. In doing so, a better adhesion of the paste is achieved on the surface, and coating generated by screen printing is predried. The device is then heated under aerobic conditions at 150° C. until all constituents of the applied paste which are volatile at this temperature have escaped. This requires a period of 10 minutes to 30 minutes.

Thereafter, the device is heated stepwise within 30 minutes from 300° C. to 400° C. under inert gas, for example under nitrogen or argon. This decomposes a large part of all organic components.

Thereafter, the device is heated stepwise from 650° C. to 800° C. under a vacuum of at least $10^{-5}$ torr to decompose all of the organic components and sinter the sinterable particles, in this exemplary embodiment glass, to each other. Here, a heating rate of at least 30 minutes is chosen. The result is an inorganic and electrically conductive layer in which carbon nanotubes are embedded and with which the method steps (II) to (IV) can be carried out. If the heating rate is extended to more than 60 minutes, the result is a layer with too high a packing density or even the complete melting of the glass particles.

Carrying out the method steps (II) to (IV) for generating such an inorganic and electrically conductive adhesive layer, from which carbon nanotubes protrude with a predominantly upright orientation, will be explained in more detail below.

To generate an elastomer film, a polymer blend is used which is produced from two components of a two-component set called SYLGRAD 184 from Dow Corning Inc. Here, the component containing the crosslinkable silicone polymer is mixed homogeneously with the component containing the crosslinking reagent in a volume ratio of ten to one. This mixture is then applied as quickly as possible after its preparation to the overall coating region by means of spin coating.

The polymer film formed in this manner according to the method step (II) is cured by heating to 70° C. within one hour to form an elastomer film. The elastomer film thus cured according to the method step (III) is manually peeled off in the method step (IV), wherein carbon nanotubes protruding from the electrically conductive adhesive layer are present predominantly with an upright orientation in the overall coating region.

After carrying out all the method steps (I) to (IV) and the completed fabrication of the electron emitter, the overall coating region of the device is provided for the emission of electrons. The electron emitter thus obtained in this exemplary embodiment is provided as a cathode for use in an X-ray tube.

Figure 2:
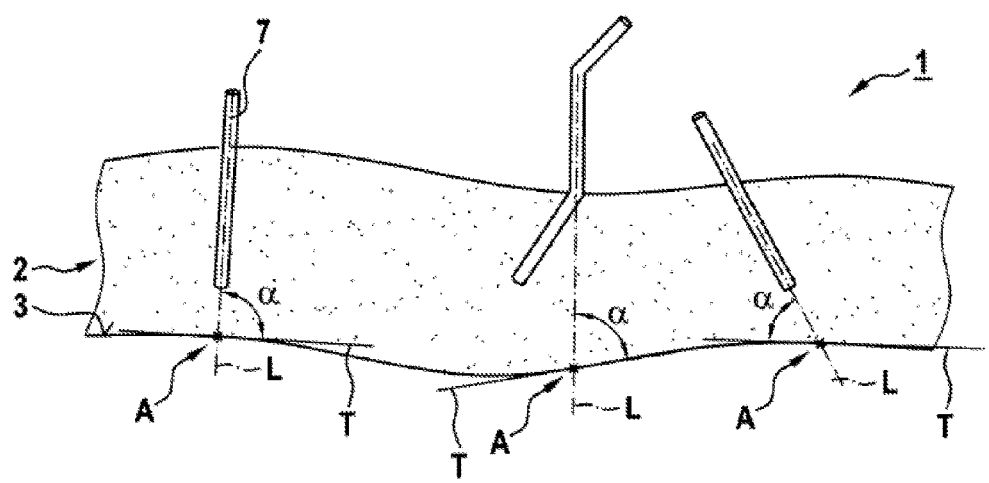
FIG. 2 shows three upright oriented carbon nanotubes 7 of electron emitter 1 of FIG. 1 in cross-section in an enlarged view.

FIG. 2 shows three carbon nanotubes 7 of electron emitter 1 with a predominantly upright orientation in cross section in an enlarged view. On the left in FIG. 2, a carbon nanotube 7 with a predominantly upright orientation can be seen, which is arranged perpendicularly, that is to say at an angle α of 90°, to a tangent T at a point of attachment A. Here, point of attachment A is given by the intersection of the central geometric longitudinal axis L of carbon nanotube 7 with component surface 3. In the middle of FIG. 2, a carbon nanotube 7 with a predominantly upright orientation is shown, which is arranged at angle α of 80° to tangent T. On the right in FIG. 2, a carbon nanotube 7 with a predominantly upright orientation is shown with angle α of 60° to tangent T.

Figure 3:
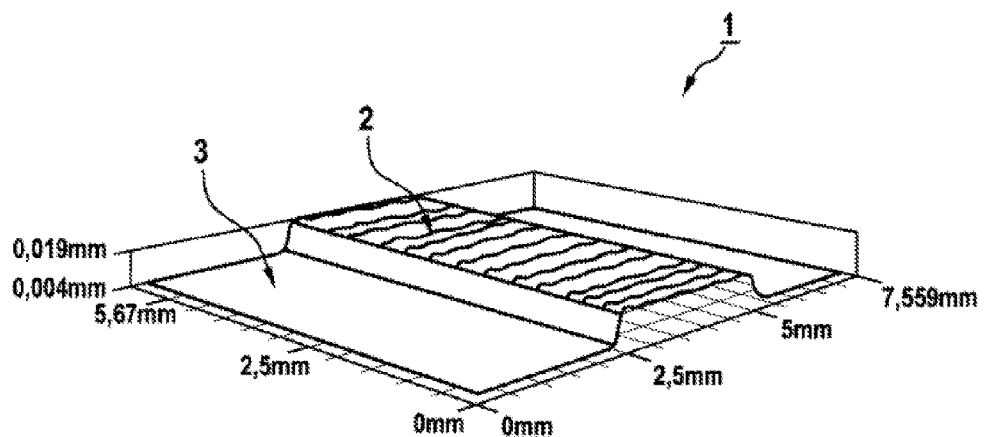
FIG. 3 shows electron emitter 1 of FIG. 1 located on a component surface 3 in three-dimensional, slightly simplified line representation.
Figure 4:
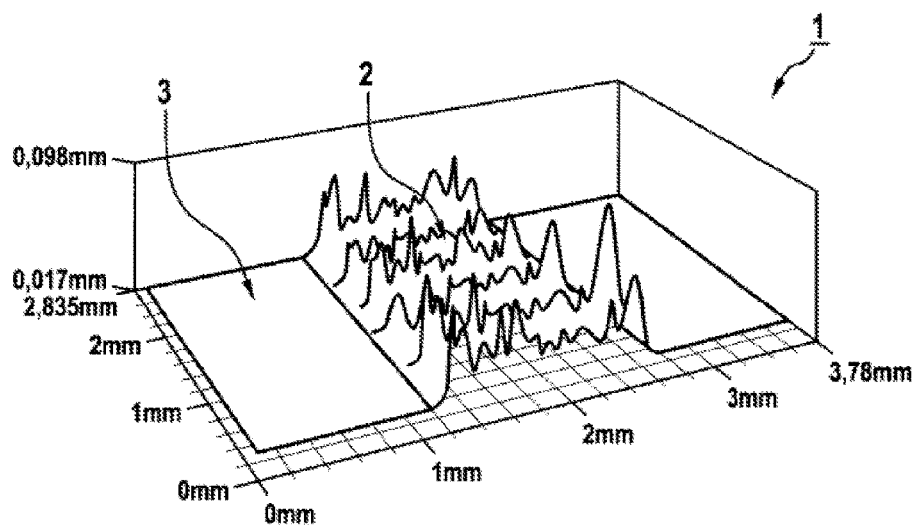
FIG. 4 shows an unclaimed electron emitter 1 in a view in analogy to FIG. 3.

FIG. 3 shows, in a slightly schematized manner, the three-dimensional structure of coating 2, which is located on component surface 3. As can be seen from the illustration, an approximately flat surface parallel to component surface 3 is formed by coating 2, in which carbon nanotubes 7 are embedded. In the comparative example according to FIG. 4 which illustrates a coating 2 containing carbon nanotubes but not produced by the method according to the invention, such a surface cannot be found, not even nearly so. This has significant influences on various parameters relevant to the operation of an electron emitter 1 in an X-ray system.

A particular advantage of coating 2 according to the invention, as visualized in FIGS. 1 to 3, is the high emission stability. For example, electron emitter 1 having this coating 2 is capable of generating pulses of 100 μm in duration defined over an operating time of a total of several 100 hours, which are generated with a frequency of 20 Hz, without significant change in the grid voltage, which is in the range of approximately 0.5 kV.

Figure 14:
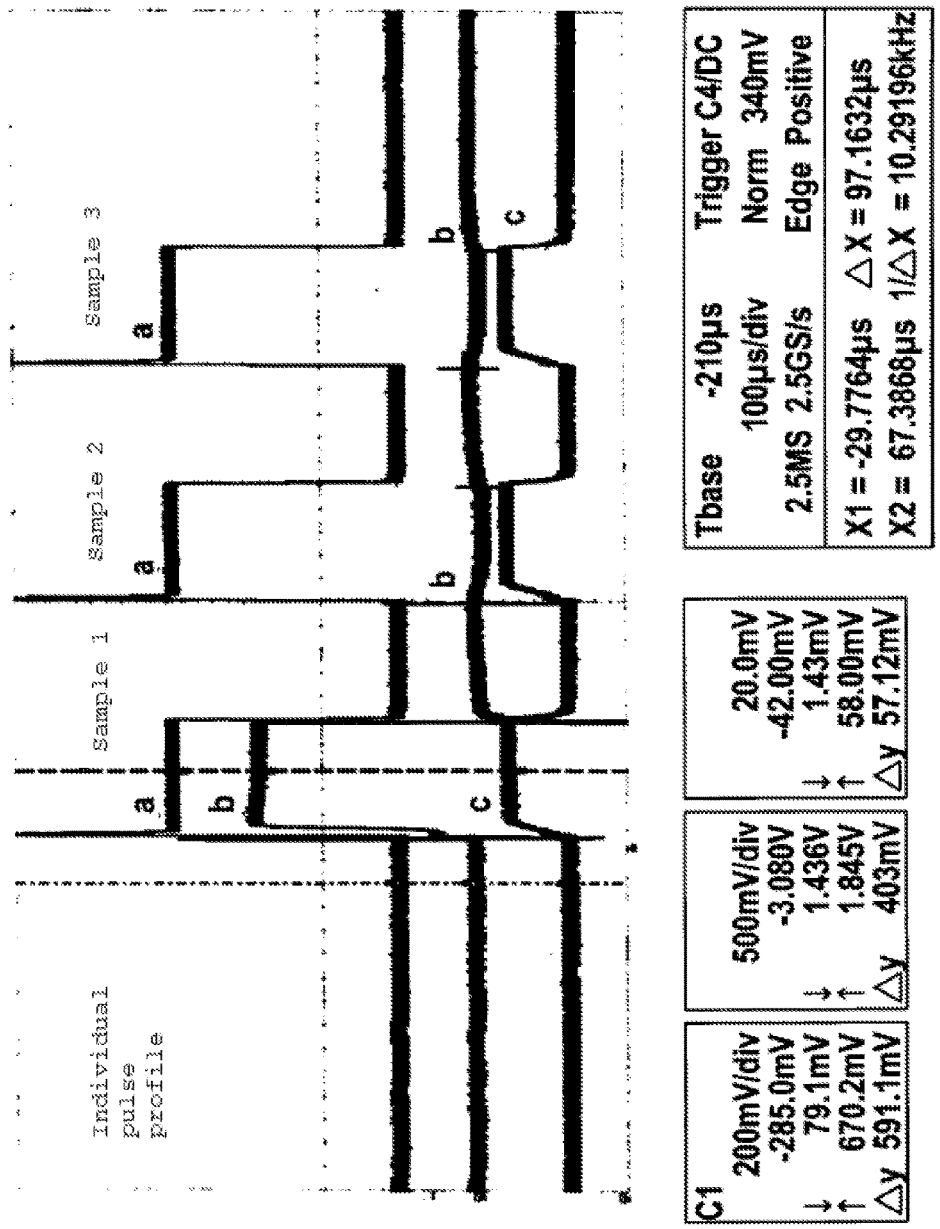
FIG. 14 shows measured operating parameters of electron emitter 1 of FIG. 11, FIG. 15 in a diagram in analogy to FIG. 13 shows the measured operating behavior of a further electron emitter 1.
Figure 15:
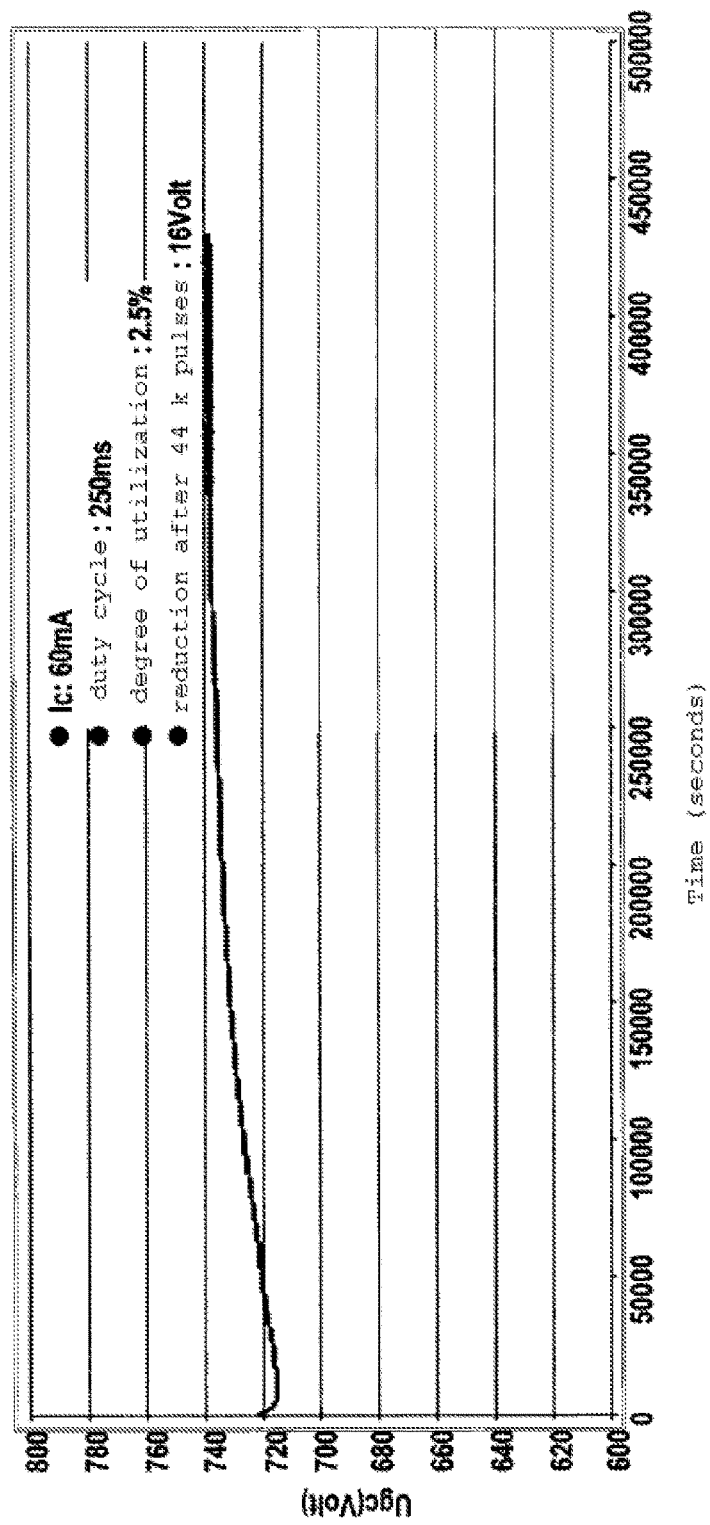

In the following, reference is made to real measurement data, which relate to electron emitter 1 (FIG. 5, 7, 8, 9, 10) shown in simplified form in FIG. 3, a group of three electron emitters 1 (FIG. 11-14) provided as identical samples, and another electron emitter 1 (FIG. 15, 16).

Figure 5:
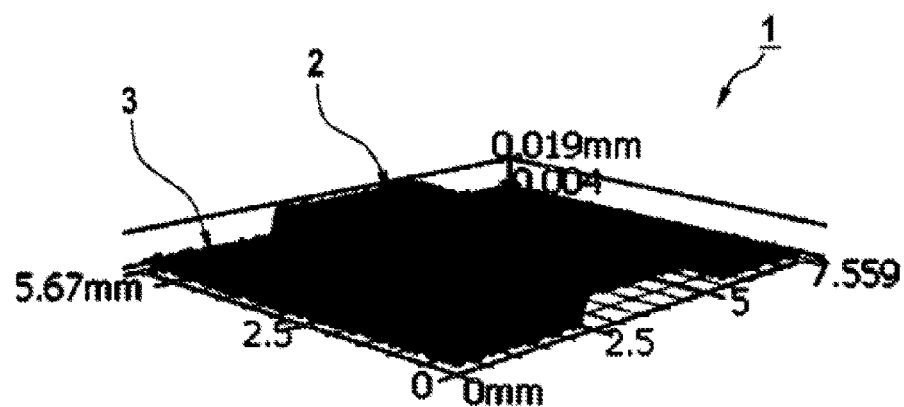
FIG. 5 shows a three-dimensional view of electron emitter 1 according to FIG. 3.
Figure 6:
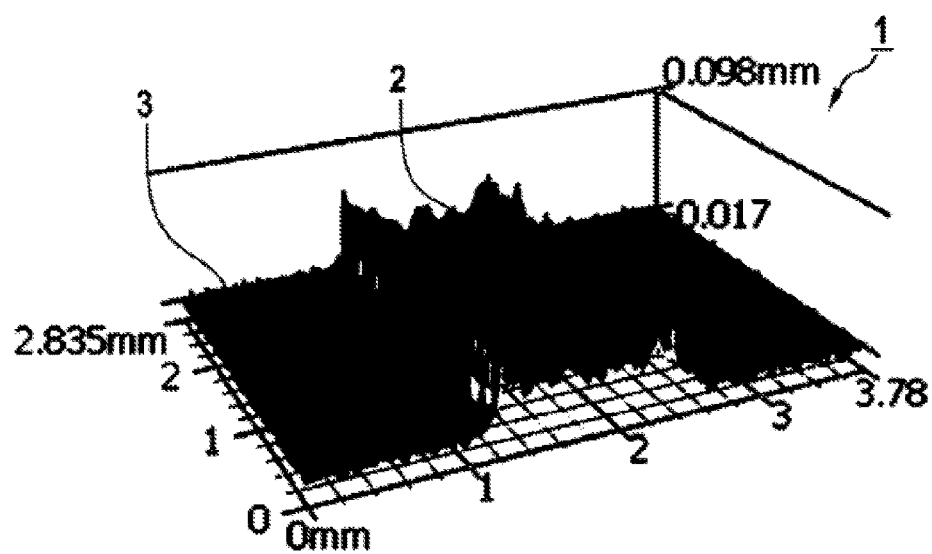
FIG. 6 shows electron emitter 1 of FIG. 4 in a view according to FIG. 5.

FIG. 5 shows the actual measured surface morphology of electron emitter 1 illustrated in FIG. 1 in a line representation. Also clearly visible in FIG. 5 is the approximately parallelepiped shape of coating 2. FIG. 6 shows, for comparison, with the data obtained in the same way as in the case of FIG. 5, the conventional comparative example already discussed with reference to FIG. 4.

Figure 7:
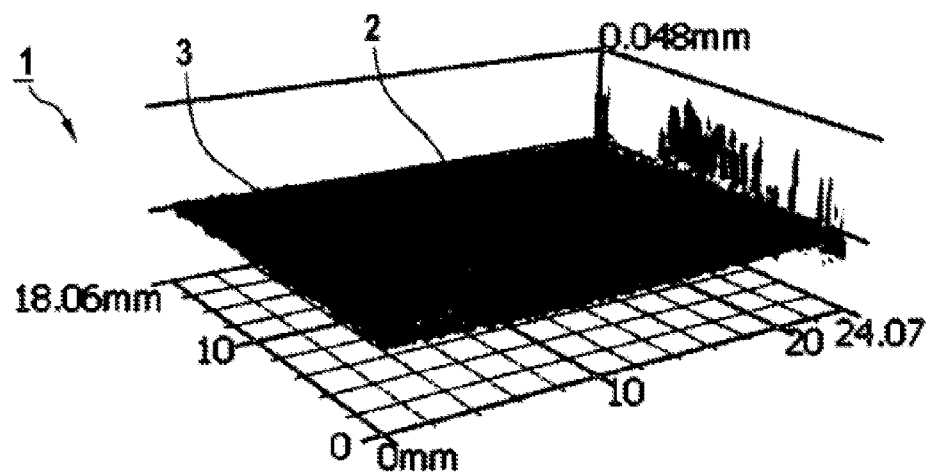
FIG. 7 shows electron emitter 1 according to FIGS. 1, 3 and 5 in a further three-dimensional, realistic representation.
Figure 8:
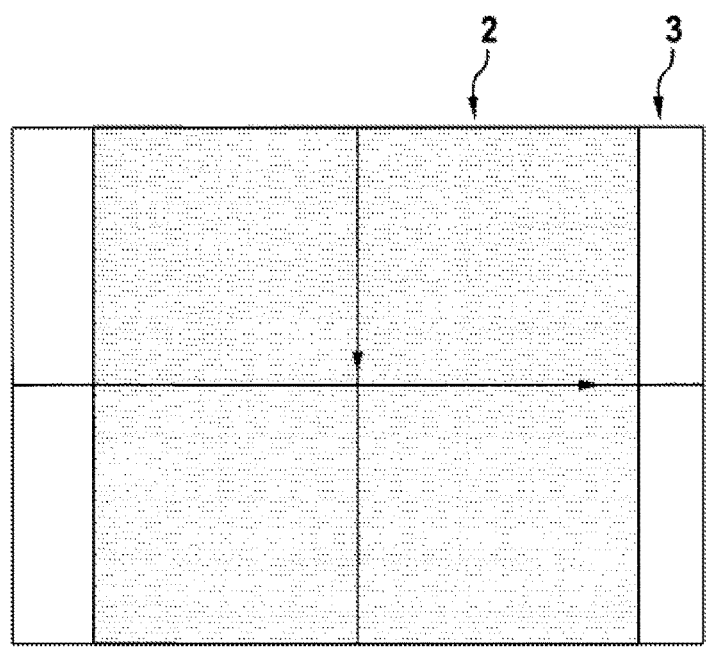
FIG. 8 shows electron emitter 1 according to FIG. 1 in plan view.
Figure 9:
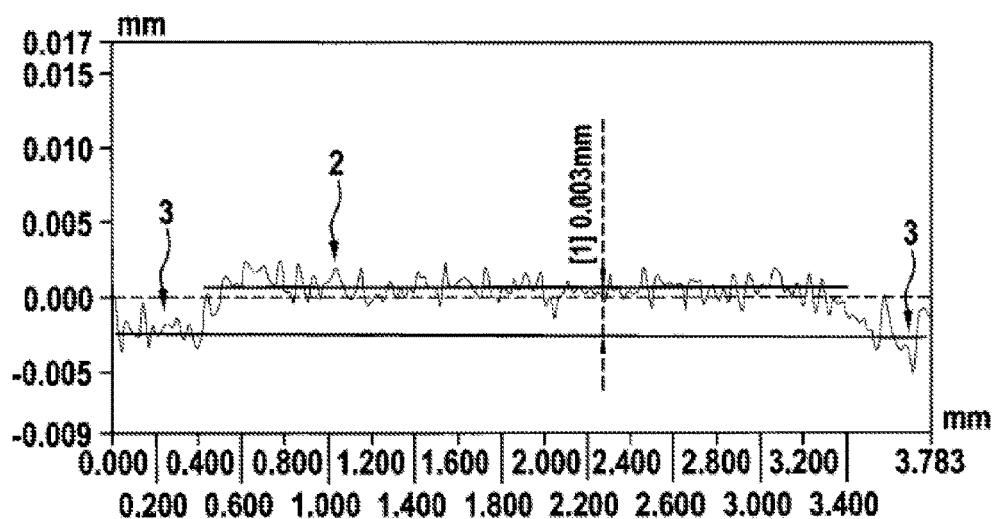
FIG. 9 shows a measured profile of electron emitter 1 according to FIG. 7.
Figure 10:
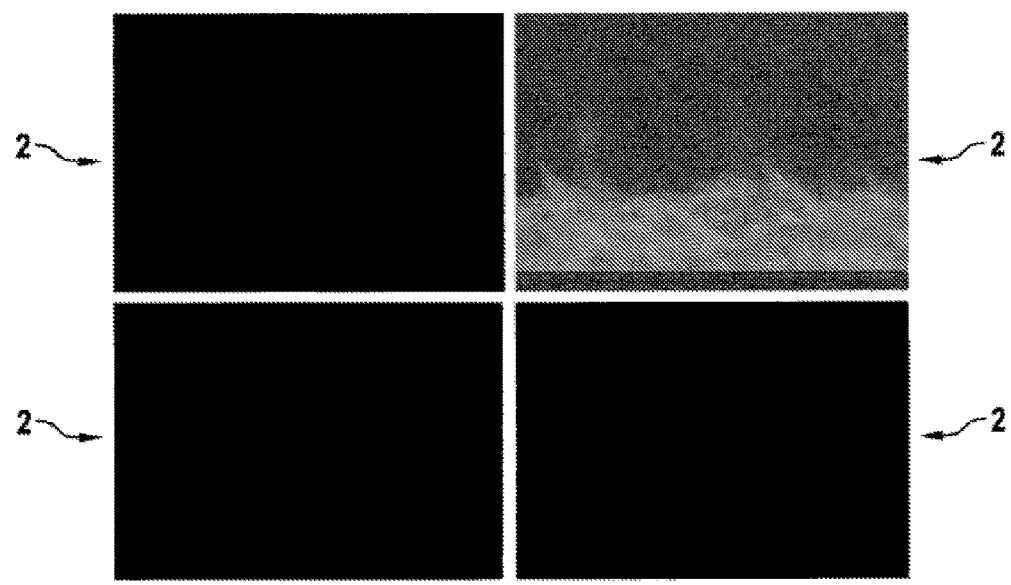
FIG. 10 shows electron micrographs of electron emitter 1 according to FIG. 7, FIG. 11 in a diagram shows characteristic curves of three electron emitters 1 of the same design.

Further geometric data of electron emitter 1 according to FIG. 5 can be taken from FIGS. 7 to 9. FIG. 9 illustrates the approximately uniform thickness of coating 2 of 0.003 mm. In addition, four scanning electron micrographs of coating 2 are attached as FIG. 10.

Figure 11:
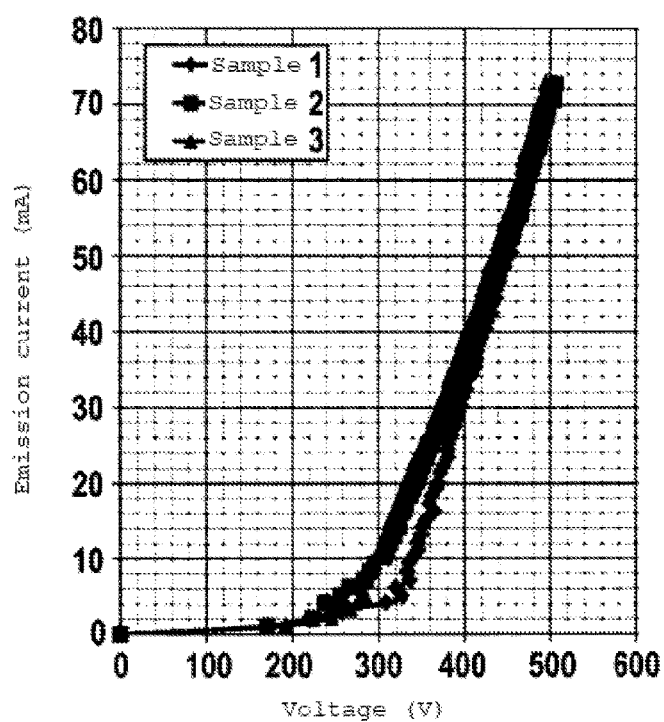
Figure 12:
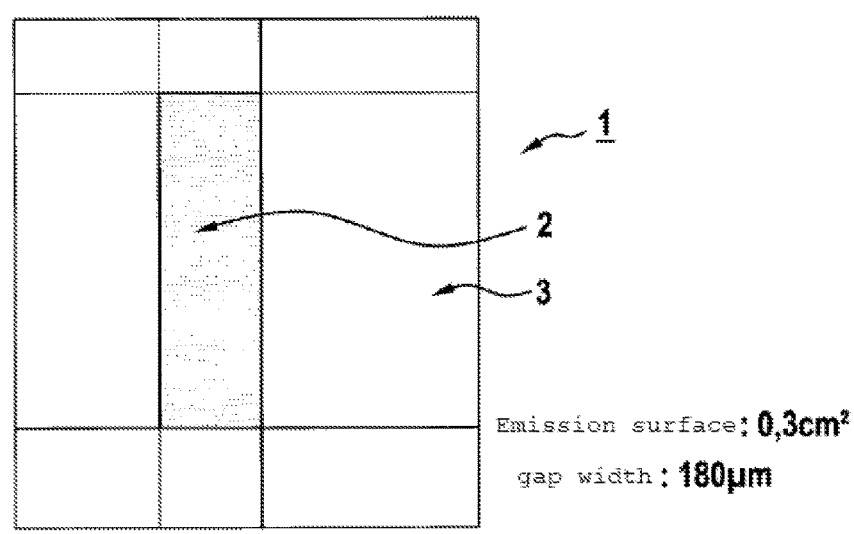
FIG. 12 shows a plan view of one of same sized electron emitter. 1 according to FIG. 11, FIG. 13 in a diagram shows the emission stability of the three electron emitters 1 according to FIG. 11.
Figure 13:
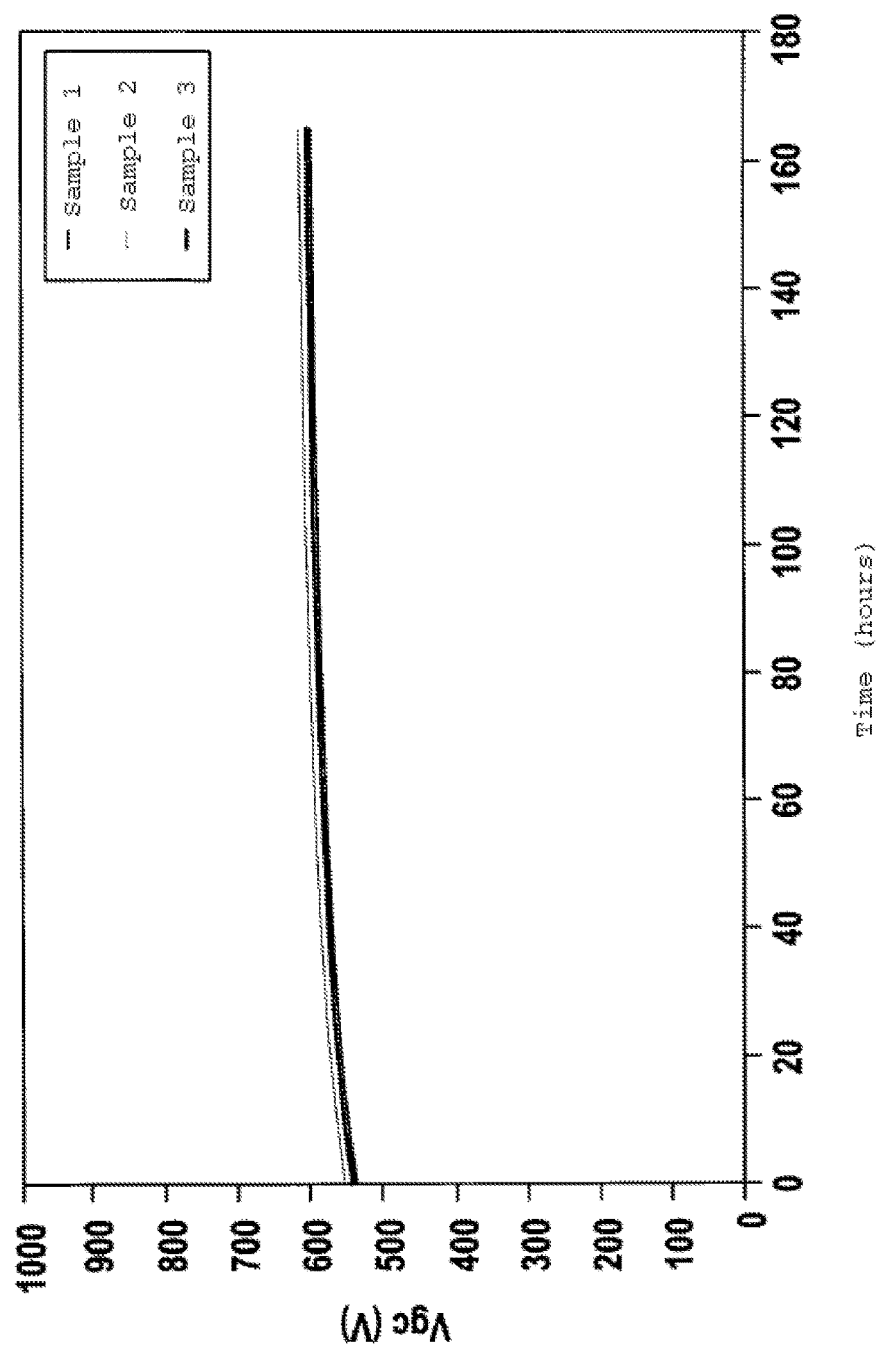

FIGS. 11 to 14 relate to three samples (sample 1, 2, 3), which in terms of their basic structure correspond to the exemplary embodiment according to FIG. 1 and have been subjected to comparative tests. FIG. 11 shows the dependence of the emission current indicated in mA on the voltage at which electron emitters 1 are operated. As can be seen from the illustration, there is only a small scatter between the individual samples. With regard to the long-term stability shown in FIG. 13, both almost identical properties of the three individual electron emitters 1 and only a slight time dependency of the grid voltage Vgt required for the operation of electron emitter 1 on the operating time are apparent. In the present case, pulses of 100 μm duration were emitted by the electron emitters 1 with a repetition frequency of 20 Hz. The experiment was carried out, as shown in FIG. 13, over a total duration of more than 160 hours. The emission current was 60 mA.

In FIG. 14, as curve a, individual emission pulses of three electron emitters 1 (60 mA each) are easily recognizable. Electron emitters 1 present as three samples (sample 1, sample 2, sample 3) were energized one after the other, as shown in FIG. 14. Only in the case of first electron emitter 1 (sample 1) was the electrical voltage between grid and emitter, recognizable as a rectangular pulse of curve b, measured with an external device. This measurement was for control purposes only and was not repeated in the case of the second and third samples. For all three samples, on the other hand, the voltage (curve c) applied between grid and emitter was captured by means of the control electronics, which controls all electron emitters 1. As can be seen from the illustration, there are virtually no differences between the voltage values captured when controlling the various electron emitters 1.

FIGS. 15 and 16 relate to a further electron emitter 1, which likewise has all the features according to the invention already explained with reference to FIGS. 1 to 4. In the case of FIGS. 15 and 16, electron emitter 1 is operated with pulses of a duration of 250 ms each. The test operation lasted well over 100 hours. Also in this case, only a small dependence of the grid voltage, designated here as Ugc, on the operating time is apparent. A particular advantage with respect to the longevity of electron emitter 1 is the fact that the increase in grid voltage Ugc slows down in the course of operation, that is, saturation is achieved.

FIG. 16 shows various measured values recorded during a single pulse of 250 ms duration. Curve a is the voltage applied between electron emitter 1 and the associated extraction grid, which voltage was both generated and measured with the aid of an electronic control system. Curve b indicates the voltage between the same elements but measured by means of an external probe (like curve b in FIG. 14). In a comparable manner, the emission current entered as curve c in FIG. 16 was captured with the aid of a separate measuring device. In contrast, curve d shows the emission current of electron emitter 1 both generated and measured by means of the control electronics.

LIST OF REFERENCE NUMERALS

1 Electron emitter
2 Coating
3 Component surface
4 Nanorod, such as carbon nanotube, not upright and not projecting out of coating
5 Inorganic and electrically conductive adhesive layer
6 Ends of the nanorod, such as carbon nanotubes, protruding from the adhesive layer
7 Nanorod, such as carbon nanotubes, protruding from the electrically conductive adhesive layer and predominantly with an upright orientation
8 Conductive particles
further designations used in FIG. 2:
d Average coating thickness
h Average partial layer thickness
i Average differential distance
α Angle
T Tangent
A Point of attachment
L Average geometric longitudinal axis

The invention claimed is:
1. A method for producing an electron emitter (1) with a coating (2) that contains nanorods (4, 7) on a component surface (3), the method comprising:
    applying nanorods (4, 7) on a coating region of the component surface via an inorganic and electrically conductive adhesive layer (5);
    applying a polymer mixture to the coating region, the polymer mixture comprising a crosslinkable silicone polymer and a crosslinking reagent;
    thermal curing a polymer film resulting from application of polymer mixture to the coating region to form an elastomer film; and
    removing the elastomer film.

2. The method according to claim 1, wherein in the inorganic and electrically conductive adhesive layer (5) further comprises:

applying by screen printing a paste containing nanorods (4, 7) and sinterable particles on the component surface; and fired firing the paste to adhere the inorganic and electrically conductive adhesive layer to the component surface, wherein, after firing, the sinterable particles are sintered together in at least one point of contact and impart adhesion on the surface of the electron emitter.

3. The method according to claim 2, wherein the paste further includes additional conductive particles (8), carbide-forming particles, an organic dispersant or an organic solvent.

4. The method according to claim 3, wherein the paste contains no more than 2% by weight nanorods (4), a total of not more than 20% by weight of glass particles, additional conductive particles (8) and carbide-forming elements of an average grain size of 0.1 µm to 5 µm, up to 48.91% by weight terpineols, up to 20.96% by weight butyl carbitol acetate and up to 8.13% by weight ethyl cellulose.

5. The method according to claim 1, wherein the nanorods (4, 7) include nanotubes.

6. The method according to claim 1, wherein as the nanorods (4, 7) include carbon or a carbide.

7. The method according to claim 1, wherein the nanorods (4, 7) include metal a oxides selected from the group containing titanium oxide, zinc oxide or manganese oxide.

8. The method according to claim 1, wherein the nanorods (4, 7) include at least one metal sulfide.

9. The method according to claim 1, wherein the nanorods (4, 7) include a nitrides selected from the group containing boron nitride, aluminum nitride, carbon nitride or gallium nitride.

10. The method according to claim 1, wherein the nanorods (4, 7) comprise multi-walled carbon nanotubes generated by arc discharging.

11. The method according to claim 1, wherein the nanorods (4, 7) comprise silicon.

12. The method according to claim 1, wherein removing the elastomer film includes peeling of the elastomer film.

13. The method according to claim 1, wherein the nanorods (4, 7) contain at least one of the elements lanthanum or cerium.

14. An electron emitter (1) comprising:
with a coating (2) including:
an inorganic and electrically conductive adhesive layer (5) on a component surface (3) of the electron emitter (1); and
nanorods (4, 7), which, over a coating region of the— inorganic and electrically conductive adhesive layer (5), has an average coating thickness (d), an average number (n) of nanorods (7) with a predominantly upright orientation that project upward from the inorganic and electrically conductive adhesive layer (5), and an average electrical sheet resistance ($R_{FM}$), wherein all the nanorods (4, 7) are adhered to the component surface (3) via the adhesive layer (5) and the coating thickness, the number of nanorods (7) protruding with an upright orientation from the adhesive layer (5) per $mm^2$, and the electrical sheet resistance ($R_F$) deviate from the average values (d, n, $R_{FM}$) by not more than 25% for each partial coating region of a size of at least $10^{-8}$ $mm^2$.

15. The electron emitter (1) according to claim 14, wherein over the coating region the average number (n) has a value of $10^4$ to $10^6$ per $mm^2$, the average electrical sheet resistance ($R_{FM}$) is not more than 1 Ω/sq and the average coating thickness (d) has a value of 8 µm to 20 µm, the average coating thickness (d) being composed of an average partial layer thickness (h) of the adhesive layer (5) of 5 µm to 15 µm and an average differential distance (i) of the ends (6) of the nanorods (4, 7) protruding from the adhesive layer (5) to the adhesive layer (5) of 3 µm to 5 µm.

16. The electron emitter (1) according to claim 14, wherein the nanorods (4, 7) have an outer diameter of 2 nm to 20 nm and a length of 1 µm to 10 µm.

17. The electron emitter according to claim 14, wherein the nanorods (4, 7) comprises multi-walled carbon nanotubes.

18. The electron emitter according to claim 17, wherein the multi-walled carbon nanotubes (4, 7) are produced by an arc discharge method.

* * * * *